Feb. 9, 1954
V. A. HOOVER
2,668,426
TORQUE LIMITING CLUTCH
Filed Oct. 1, 1948
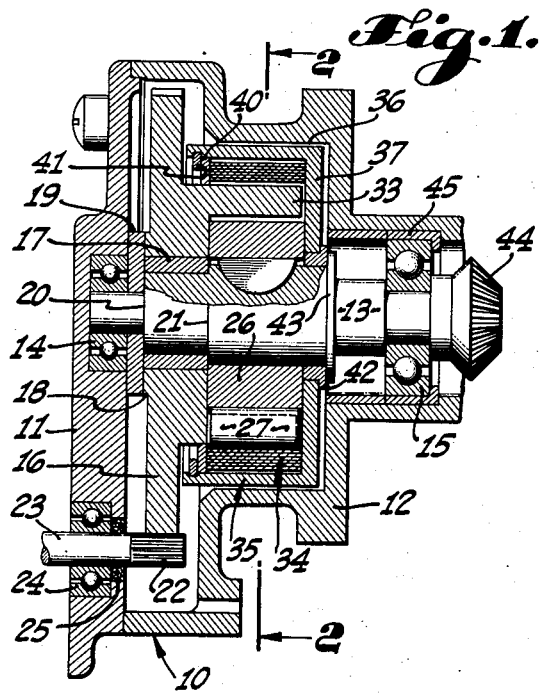
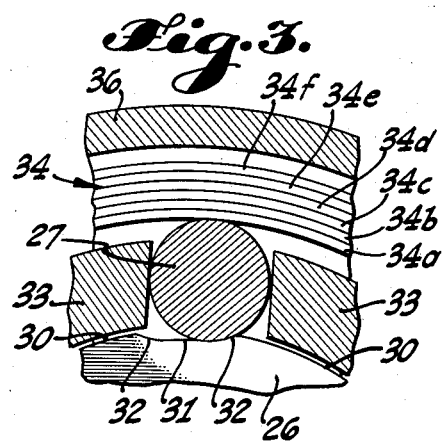
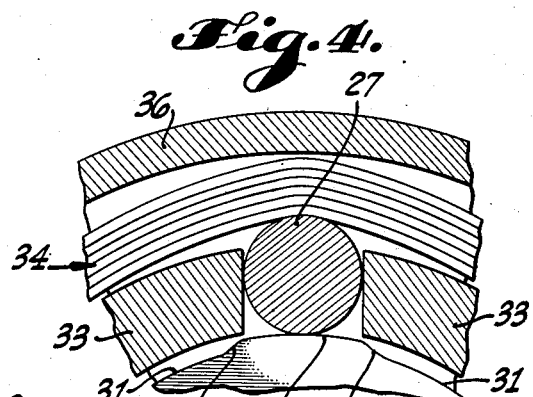
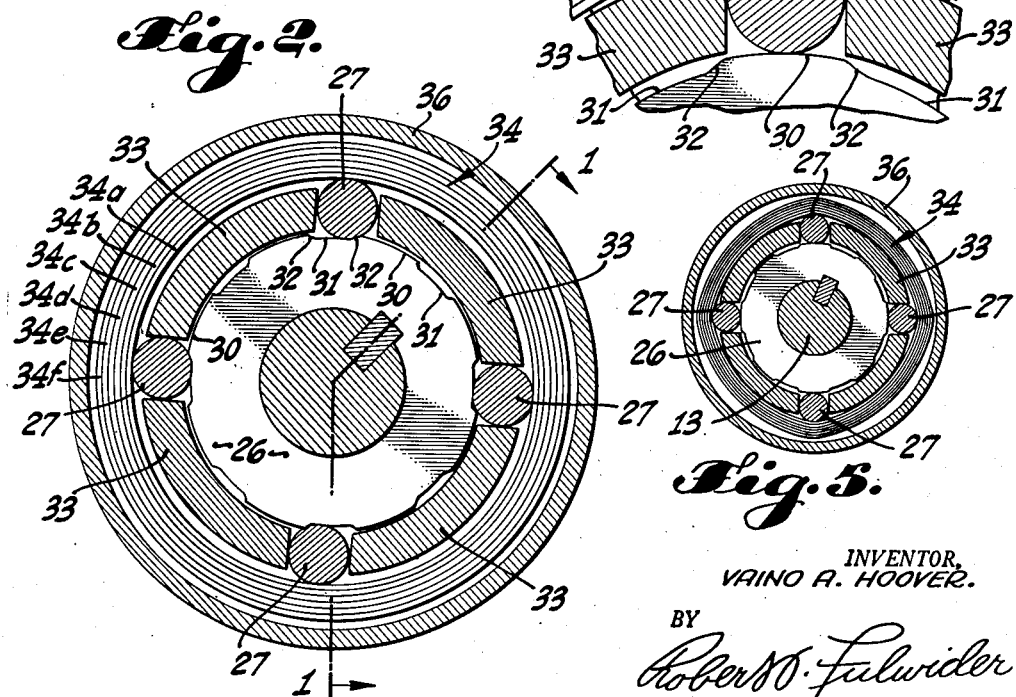
INVENTOR.
VAINO A. HOOVER.
BY
Robert W. Fulwider
ATTORNEY Patented Feb. 9, 1954

2,668,426

UNITED STATES PATENT OFFICE 2,668,426

TORQUE LIMITING CLUTCH

Vaino A. Hoover, Los Angeles, Calif.

Application October 1, 1948, Serial No. 52,376

2 Claims. (Cl. 64—29)

My invention relates generally to clutches and more particularly to clutches of the type adapted to transmit only a predetermined amount of torque, known generally as torque limiting clutches.

In many different fields, it is often necessary to transmit rotary power from a driving member to a driven member, while limiting this power to some predetermined value or torque so that mechanical injury or damage will not occur. For example, it is sometimes desirable to drive one member against another member so that a predetermined amount of pressure is applied therebetween, without exceeding this pressure. Limit stops and switches cannot conveniently be used for this purpose, since the speed and momentum of the moving parts will contribute largely to the resulting pressure if this method of control is used. Clutches having frictionally engaging plates are unsatisfactory since the maximum torque transmitted will depend upon so many variables, including the previous history of the frictional clutch surfaces. Furthermore, once relative movement has occurred between the engaging or driving surfaces of friction clutches, the clutch faces are rapidly heated and destroyed by the power absorbed by the clutch.

Because of the severe conditions of use to which many clutches are subjected, it is very important that a clutch of any type, including a torque limiting clutch, be simply and ruggedly constructed and require a minimum of maintenance and servicing.

It is therefore a major object of my invention to provide an improved torque limiting clutch.

Another object of my invention is to provide such a clutch in which the maximum torque transmitted thereby may be accurately set at a predetermined value, and the clutch will maintain this setting throughout an extended number of operations.

It is another object of my invention to provide a clutch of this type that is positive in operation and does not require special care in order to retain its calibration.

A further object of my invention is to provide a clutch having these characteristics, operable to transmit the same amount of torque whether the clutch is driven in one direction or the other.

It is an additional object of my invention to provide a clutch in which the power absorbed in the clutch after the torque limit is exceeded is reduced to a minimum.

It is a still further object of my invention to provide a clutch of this type of simple and rugged construction, requiring a minimum of maintenance and servicing throughout its life.

These and other objects and advantages of my invention will become apparent from the following description of a preferred form thereof, and from the drawings illustrating that form, in which:

Figure 1 is a broken axial sectional view, taken as indicated by the line 1—1 of Figure 2;

Figure 2 is a cross-sectional view of the operating portion of the clutch with the housing removed, taken along the line 2—2 of Figure 1;

Figure 3 is a fragmentary enlarged view of the various members of the clutch as they normally appear when transmitting a torque from the driving to the driven members;

Figure 4 is a similar fragmentary enlarged view showing the relationship of the various members when the predetermined torque has been exceeded; and Figure 5 is a diagrammatic view showing the deformation of the springs which occurs when the predetermined torque is exceeded.

Briefly, my improved clutch includes a rotatable driving member having a plurality of axially extending, outwardly projecting fingers. A driven member, rotatable with respect to the driving member, is mounted within the fingers so that the latter overlie the periphery of the driven member but are spaced from it. The outer surface of the driven member is serrated or provided with grooves to form a cam-like member, and a series of rollers are mounted between the fingers to bear against the cam-like surface of the driven member. A circular spring surrounds the fingers and the rollers to urge the latter inwardly, against the driven member, and rotation of the driving member and its fingers moves the rollers bodily about the axis of the driven member. Normally, the rollers will lie in the grooves or troughs of the serrations, and will transmit their rotation to the driven member. However, when an excessive amount of torque is exerted, the rollers will move out of the grooves or troughs, against the urging of the spring, and ride over the serrations.

Referring now to the drawings and particularly to Figures 1 and 2 thereof, the numeral 10 indicates generally a housing preferably formed of a pair of sections 11 and 12 that are held together by bolts or other suitable means. The housing section 12 is generally cylindrical in shape, and a shaft 13 is mounted within the housing 10 and supported by suitable anti-friction bearings 14 and 15 mounted in the housing sections 11 and 12, repectively. Preferably, the bearings 13 and 14 are selected to receive axially directed loads, though this is not always essential.

Located on the shaft 13 adjacent the bearing 14 is a gear 16 having a central bushing 17 of suitable bearing material, such as bronze, to permit the rotation of the gear with respect to the shaft. The side of the gear 16 adjacent the bearing 14 is provided with a central boss 18, and a disc 19 of bronze or other suitable bearing material is placed between the boss and the bearing to prevent axial movement of the gear toward the bearing. The diameter of the shaft 13 adjacent the bearing 14 is relatively small, and the disc 19 is mounted on this portion of the shaft and held against movement away from the bearing by a shoulder 20 substantially aligned with the bushing 17. The enlarged portion of the shaft 13, providing the shoulder 20, carries the bushing 17, and at the end of the bushing remote from the bearing 14, the shaft is again enlarged to provide a shoulder 21. The bushing 17 is thus held against axial movement with respect to the shaft 13, and by firmly connecting the gear 16 to the bushing, the gear likewise is held against axial movement with respect to the shaft while being rotatable with respect thereto.

The gear 16 is driven by a pinion 22 mounted on the end of a driving shaft 23 that is connected to a motor or other suitable means (not shown). Preferably, I provide a suitable anti-friction bearing 24 to maintain the shaft 23 in proper alignment and thereby insure the proper meshing of the pinion 22 with the gear 16. Where necessary, an oil seal 25 of any suitable type may be interposed between the bearing 24 and the pinion 23 to prevent the passage of lubricant between the motor and the interior of the housing 10.

Mounted on the shaft 13 adjacent the gear 16 is a generally circular cam member 26 that is keyed or otherwise securely fastened to the shaft for rotation therewith. It will be appreciated that while the gear 16 is adjacent the cam 26, the gear is free to rotate with respect to the shaft while the cam is firmly held to the shaft. Consequently, as hereinafter described, it is possible for the gear 16 to be rotated though the shaft 13 and the cam 26 are held against any movement.

In order to transmit a torque or rotational force from the gear 16 to the cam 26, I provide a number of rollers 27 disposed about the periphery of the cam with their axes substantially parallel to the axis of the shaft 13, and I bodily rotate these rollers about the axis of the shaft by a suitable connection to the gear. The outer periphery of the cam 26 is provided with a number of serrations including alternate crests 30 and grooves or troughs 31 extending generally parallel to the axis of the shaft 13, the rollers 27 resting upon the outer surface of the cam in the grooves, as shown in Figure 2. Each groove 31 is connected to its adjacent crests 30 by rises 32, and the rise at one end of a groove is preferably similar to that at the opposite end so that the same amount of torque will be transmitted in either direction of rotation, as hereinafter described. While it will be apparent that the number of rollers 27 may be changed to meet varying conditions, in the clutch I have illustrated there are four rollers, and I have illustrated the cam 26 as having eight crests 30 and eight grooves 31. The rollers 27, of course, are spaced evenly around the periphery of the cam 26, and the crests 30 and grooves 31 are likewise spaced evenly around the periphery of the cam so that all of the rollers simultaneously assume corresponding positions with respect to their associated crests and grooves. While I have shown twice as many crests 30 and grooves 31 as there are rollers 27, this is a matter of choice and the number of crests and grooves may be any integral multiple of the number of rollers.

To drive the rollers 27 about the axis of the shaft 13, I provide a series of axially extending fingers or projections 33 projecting outwardly from the face of the gear 16 to overlie the cam 26 and formed, in the model shown, as generally chordal sections of an annular sleeve. A circumferential gap is provided between each pair of adjacent fingers 33, and it is within this gap that one of the axially extending rollers 27 is mounted. I prefer to form the adjacent faces of adjoining fingers 33 parallel to each other and to a radially extending line midway between them, and one of these faces bears against the roller 27 to rotate the latter about the axis of the shaft 13 when the gear 16 is rotated. The radial thickness of each finger 33 need only be that sufficient to withstand the forces which will be imposed upon it during the operation of the clutch, taking into account the desired factor of safety and other features, in accordance with good engineering practice. Since each finger 33 will normally make only a line contact with the roller 27 it is driving, it is generally unnecessary that the finger 33 extend appreciably beyond the center line or axis of its associated roller, measured in a direction radially outward from the axis of the shaft 13.

Surrounding the fingers 33 and the rollers 27 is a spring assembly 34 of generally cylindrical shape, concentric with the axis of the shaft 13. As indicated in the drawings, the spring assembly 34 preferably consists of a plurality of coaxial and axially coextensive endless cylindrical bands 34a, 34b, 34c, etc. The bands are normally circular, in their unstressed condition, and the outer diameter of one band is very slightly smaller than the internal diameter of the next larger band so that the bands may be nested one within the other, while still permitting the joint action of all of the bands instead of only the innermost band.

The bands 34a, 34b, 34, etc., are held in position by a retainer 35 having a cylindrical outer wall 36 and a generally flat end wall 37. The opposite end of the retainer 35, adjacent the gear 16, is left open to receive the springs or bands 34a, 34b, 34c, etc., and a washer-type retaining member 40 is placed within the cylindrical wall 36, adjacent the ends of the springs or bands, to hold the latter in place. A retaining ring 41, preferably of the snap-in type, is fitted within a groove formed on the interior of the cylindrical wall 36 adjacent the open end of the retainer 35, thereby securely holding the member 40 in position while providing the maximum ease of assembly. As indicated, the retainer 35 is so formed that the washer-type retaining member 40 holds one end of the spring assembly 34 while the end wall 37 bears against the opposite end thereof.

Since the axial length of the springs 34a, 34b, 34c, etc. is substantially equal to the axial length of the cam 26, the end wall 37 of the retainer 35 has its inner face adjacent the end of the cam remote from the gear 16. A bushing 42 is mounted on the shaft 13 adjacent that end of the cam 26, and supports the end wall 37 so that the spring retainer 35 is rotatable with respect to the shaft. The bushing 42 is consequently formed of a suitable bearing material such as bronze, and is held in place, against the cam 26, by an outwardly projecting flange or shoulder 43 formed on the shaft 13. As previously mentioned, the adjacent end of the shaft 13 is suitably supported in an anti-friction bearing 15, and the shaft preferably extends therethrough to carry a gear 44 or other suitable power transmitting means on its end. For convenience in assembly and installation, I prefer to mount the bearing 15 in a hardened sleeve 45 so that by removing the flat section 11 of the housing 10, all of the operating mechanism of my torque limiting clutch may be removed from the interior of the cylindrical section 12 of the housing without requiring access from the opposite end thereof.

*Operation*

Assuming that my improved torque limiting clutch has been assembled as just described, its normal operation, while transmitting less than the predetermined limiting torque, is quite simple. Rotation of the driving shaft 23 turns the pinion 22 to drive the gear 16 and the attached fingers 33 about the axis of the shaft 13. As the fingers 33 turn, they carry the rollers 27 with them, moving these rollers bodily about the axis of the shaft 13. During this rotation, the rollers 27 are urged radially inwardly by the spring assembly 34, and the rollers consequently ride in the grooves 31 of the cam 26. If the external surface of the cam 26 were a smooth cylinder, the rollers 27 would roll about it without transmitting any appreciable torque to it. However, because of the rises 32, each roller 27 bears against an associated rise and transmits a torque to the cam 26 tending to rotate the cam and the shaft 13 about the axis of the latter. Radially outward movement of the rollers 27, necessary for the rollers to ride over the rises 32, is prevented by the spring assembly 34, and consequently the driving gear 16 and the cam 26 rotate synchronously so long as the predetermined torque is not exceeded.

However, when the shaft 13 or the equipment driven by it is jammed or otherwise restrained, the torque which would be delivered to the shaft is in excess of the predetermined value, and consequently the torque limiting feature of my clutch comes into operation. Under these conditions, the force exerted by the rollers 27 against the associated rises 32 reaches a value such that the rollers move radially outwardly, against the urging of the spring assembly 34, thereby deforming the latter. When this occurs, the rollers 27 roll from the position indicated in Figure 3 to the position on the crests 30, indicated in Figure 4. Since there is nothing on the crests for the rollers to bear against, the rollers roll across the crests and then drop into the next grooves 31 where they again encounter rises 32, ride up the latter, and continue this action until the load on the shaft 10 is reduced, or the driving shaft 23 is stopped. It will be noted that by this operation, the shaft 13 is subjected to a series of impulses, one of such impulses occurring each time the rollers 27 encounter a rise 32 and then start to ride up the latter. In this manner, there is positive assurance that the same maximum permissible amount of torque is delivered to the shaft 13, before the torque limit of the clutch is exceeded, and the rollers are forced over the rise of the cam, which represents a major improvement over the action of so-called friction clutches whose setting may vary over relatively wide limits between successive operations.

One of the important features of my invention resides in the fact that the spring assembly 34 is not stretched when the rollers 27 are riding upon the crests 30, but instead the spring assembly is deformed to assume a different shape. In the form shown, wherein I use four rollers 27, the spring assembly 34 will assume a generally rectangular shape when the rollers are upon the crests 30. If a greater or lesser number of rollers are used, the resulting configuration of the spring assembly 34 will still be that of a polygon, the number of sides of the polygon corresponding to the number of rollers used. When the rollers 27 are moved radially outwardly, the portion of the spring assembly 34 intermediate adjacent rollers will be moved radially inwardly, and consequently it is important that the fingers 33 be formed to permit this movement of the spring assembly.

Under normal conditions of operation, the spring assembly 34 rotates synchronously with the cam 26 and the driving gear 21, but when the predetermined limiting torque has been exceeded, the rollers 27 will move over the surface of the cam and rotate about their own axes in addition to rotating about the axis of the shaft 13. As a result, the rotation of the rollers 27 about their own axes will cause the rotation of the spring assembly 34 in a manner similar to the operation of a planetary gear train, and consequently, it is desirable that the retainer 35 be mounted for rotation with respect to the cam 26.

While I have shown the spring assembly 34 as composed of a plurality of thin but relatively wide springs, it will be appreciated that the thickness and width of the springs may be changed as desired. For example, a single spring of somewhat greater thickness may be used, and the width of the spring may be varied within relatively wide limits so long as it is held concentric with the axis of shaft 13. Thicker springs, of course, have the disadvantage that they are likely to be too rigid and inflexible to be deformed in the manner described. I prefer to use several thinner springs which provide for a greater radial movement of the rollers and a lower pressure on the cam face, thus permitting a longer life for the clutch assembly. However, it is a simple matter to select a spring assembly 34 having the desired and necessary characteristics. In this respect, it will be appreciated that the stiffness of the spring assembly 34 is one of the principal factors controlling the torque transmitted by the clutch, other factors being the steepness of the rises 32, the diameter of the rollers 27, etc. Because of the construction and operation of the spring assembly 34 and the symmetrical shape of the cam 26, my improved clutch will operate equally well in either direction of rotation, and will also transmit power from the gear 16 to the cam 26, or in the opposite direction.

While I have shown and described a preferred form of my invention, it will be apparent that modifications such as those suggested may be made without in any manner departing from the broad features of my invention as defined herein. Consequently, I do not wish to be restricted to the particular form or arrangement of parts herein described and shown, except as limited by my claims.

I claim:

1. A torque limiting clutch which includes: a a shaft; a driving member mounted on said shaft for rotation with respect thereto; a cam-shaped driven member mounted on said shaft for rotation therewith, adjacent said driving member, said driven member being generally circular in shape and having a plurality of generally axially extending serrations on its outer face; a plurality of axially extending fingers projecting from said driving member to overlie said driven member and spaced radially outward therefrom, said fingers being formed as chordal portions of an annular ring with circumferentially extending spaces between adjacent fingers, said spaces being uniformly located around the circumference of said driven member; a plurality of rollers whose axes are parallel to the axis of said shaft, located between said fingers and rotatable thereby about the axis of said shaft, said rollers engaging said serrations of said driven member to rotate the latter; an endless band comprising a plurality of concentric members fitted one within another and surrounding said rollers, said concentric members cooperating with each other and said rollers to urge said rollers inwardly toward said driven member, said band being of a resilient material and of a circular shape when said rollers are in the troughs formed by said serrations, but deformable, without increase in its peripheral dimension, into a polygonal shape as said rollers rise to the crests formed by said serrations, said band being free to rotate about the axis of said shaft and being rotated thereabout by said rollers as the latter ride over said rises; and generally annular retaining means adjacent said driven member and rotatable with respect thereto and with respect to said driving member, mounted on said shaft for rotation with respect thereto, but held against axial movement and against displacement from a plane substantially perpendicular to the axis of said shaft, said retaining means surrounding said resilient band and being radially spaced therefrom when said band has its circular configuration, the axial ends of said band being held against displacement by said driving means and said retaining means, whereby said band is held in alignment with said rollers at all times.

2. A torque limiting clutch which includes: a shaft; a driving member mounted on said shaft for rotation with respect thereto; a driven member in the form of a generally circular cam having serrations on its periphery, mounted on said shaft for rotation therewith, adjacent said driving member; axially extending fingers attached to said driving member, radially spaced from said driven member; a plurality of rollers whose axes are parallel to the axis of said shaft, located between said fingers and rotatable thereby about the axis of said shaft, said rollers engaging said serrations of said driven member to rotate the latter; and endless band comprising a plurality of concentric members fitted one within another and surrounding said fingers and said rollers, said concentric members cooperating with each other and rollers to urge said rollers inwardly into engagement with the serrations on said driven member, said band being of a resilient material and normally being of a circular shape, but deformable into a polygonal shape without changing its peripheral dimension as said rollers are moved outwardly to override the crests, formed by said serrations in said driven member, when a predetermined torque is exceeded, said band being rotatable with respect to both said driving and driven members; and retaining means surrounding said band, mounted on said shaft for rotation with respect to both said driving member and said driven member but held against axial movement with respect to said shaft, said means being radially spaced from said band and in contact with the axial ends thereof to retain said band in alignment with said rollers.

VAINO A. HOOVER.

References Cited in the file of this patent

UNITED STATES PATENTS

| Number | Name | Date |
|---|---|---|
| 1,325,464 | Decker | Dec. 16, 1919 |
| 2,098,785 | Mathewson | Nov. 9, 1937 |
| 2,344,673 | Brown | Mar. 21, 1944 |

FOREIGN PATENTS

| Number | Country | Date |
|---|---|---|
| 621,098 | France | 1927 |